(12) United States Patent
Kloos et al.

(10) Patent No.: US 7,678,277 B2
(45) Date of Patent: Mar. 16, 2010

(54) MATERIALS FOR PROCESSING NON-AQUEOUS MIXTURES AND METHODS FOR THEIR PREPARATION

(75) Inventors: Steven D. Kloos, Chanhassen, MN (US); Keith Schwartz, Corvallis, OR (US); Brian Rudie, Rockford, MN (US)

(73) Assignees: GE Osmonics, Inc., Minnetonka, MN (US); Cargill, Incorporated, Wayzara, MN (US)

( * ) Notice: Subject to any disclaimer, the term of this patent is extended or adjusted under 35 U.S.C. 154(b) by 353 days.

(21) Appl. No.: 11/293,869

(22) Filed: Dec. 2, 2005

(65) Prior Publication Data

US 2006/0118482 A1  Jun. 8, 2006

Related U.S. Application Data

(63) Continuation of application No. PCT/US2004/017293, filed on Jun. 2, 2004.

(60) Provisional application No. 60/475,281, filed on Jun. 2, 2003, provisional application No. 60/475,282, filed on Jun. 2, 2003, provisional application No. 60/475,582, filed on Jun. 2, 2003, provisional application No. 60/474,991, filed on Jun. 2, 2003.

(51) Int. Cl.
  *B01D 61/00* (2006.01)
  *A23L 2/02* (2006.01)
  *A23D 9/02* (2006.01)

(52) U.S. Cl. ............. 210/651; 210/650; 426/425; 426/429; 426/489; 426/330.6

(58) Field of Classification Search ................ 210/500.27–500.43, 651, 650; 264/41, 48, 264/4, 178, 171.26, 321.89, 650–654; 426/425, 426/429, 489, 417, 330.6
See application file for complete search history.

(56) References Cited

U.S. PATENT DOCUMENTS

| 3,753,932 | A | * | 8/1973 | Jenkins ................. 521/61 |
| 3,763,055 | A | * | 10/1973 | White ................. 521/62 |
| 3,852,224 | A | * | 12/1974 | Bridgeford ............... 264/49 |
| 4,046,843 | A | * | 9/1977 | Sano et al. ................. 264/469 |
| 4,289,600 | A | * | 9/1981 | Lazarz et al. ............... 204/296 |
| 4,399,035 | A | * | 8/1983 | Nohmi et al. .......... 210/500.23 |
| 4,707,266 | A | * | 11/1987 | Degen et al. ............. 210/638 |
| 4,774,039 | A | * | 9/1988 | Wrasidlo ................. 264/41 |
| 4,954,388 | A |   | 9/1990 | Mallouk et al. |
| 4,970,034 | A | * | 11/1990 | Ly et al. .................. 264/46.4 |
| 5,374,243 | A | * | 12/1994 | Whalen et al. ................ 604/23 |
| 5,433,860 | A | * | 7/1995 | Yasuda .................. 210/651 |
| 5,707,673 | A | * | 1/1998 | Prevost et al. ................ 426/417 |
| 5,762,798 | A | * | 6/1998 | Wenthold et al. ....... 210/500.23 |
| 6,006,256 | A | * | 12/1999 | Zdepski et al. ............. 725/114 |
| 6,440,306 | B1 | * | 8/2002 | Ditter et al. ............ 210/500.41 |
| 6,521,130 | B1 | * | 2/2003 | Kono et al. ................. 210/652 |
| 6,589,615 | B1 | * | 7/2003 | Yen ................. 428/34.8 |
| 6,896,996 | B2 | * | 5/2005 | Marchionni et al. ......... 429/324 |
| 7,085,202 | B2 | * | 8/2006 | Miyamoto et al. ........ 369/44.27 |
| 7,144,505 | B2 | * | 12/2006 | Han et al. ............ 210/500.41 |
| 7,284,668 | B2 | * | 10/2007 | Charkoudian ............... 210/490 |
| 7,494,679 | B2 | * | 2/2009 | Jirjis et al. ............... 426/330.6 |

FOREIGN PATENT DOCUMENTS

| EP | 0352798 A2 | 1/1990 |
| EP | 0732122 A1 | 9/1996 |
| EP | 1038570 A1 | 9/2000 |

* cited by examiner

*Primary Examiner*—Ana M Fortuna
(74) *Attorney, Agent, or Firm*—Global Patent Operation; Barbara A. Toop

(57) ABSTRACT

The invention provides porous matrices that comprise one or more anionic surfactants that can be used in non-aqueous environments.

13 Claims, No Drawings

MATERIALS FOR PROCESSING NON-AQUEOUS MIXTURES AND METHODS FOR THEIR PREPARATION

PRIORITY OF INVENTION

This application is a continuation under 35 U.S.C. 111(a) of PCT/US2004/017293, filed on Jun. 2, 2004, and published in English on Dec. 23, 2004 as WO 2004/110600A1, which claims the benefit under 35 U.S.C. 119(e) of U.S. Provisional Patent Application Ser. Nos. 60/475,281, 60/475,282, 60/475,582, and 60/474,991, all filed Jun. 2, 2003, which applications and publication are incorporated herein by reference.

GOVERNMENT FUNDING AND RIGHTS

This invention was made with United States Government support under cooperative agreement 70NANB8H4028 awarded by the National Institute of Standards and Technology (NIST). The United States Government has certain rights in the invention.

BACKGROUND OF THE INVENTION

Semi-permeable membranes (e.g. reverse osmosis, nanofiltration, ultrafiltration, and microfiltration membranes) have a long history of use in separating solution components. Such membranes are a type of separation device that is able to retain certain substances while transmitting others. The components of the feed fluid that pass through the membrane are the "permeate" and those that do not pass through the membrane are the "retentate." In practice, the permeate, the retentate, or both, may represent a desired product and may be used directly or be subjected to further processing.

Membranes have been widely used in a variety of water-based applications including water desalination, salt fractionation, and protein concentration. To a more limited extent, membranes have also been employed in non-water-based applications.

One limitation on the use of membranes in non-aqueous separations has been the need to "condition" the membrane prior to use. Typically, membranes are prepared in aqueous environments and they are preserved with water-based preservatives or by drying from glycerin. As a result, the membranes are not wettable with non-polar solvents or with non-polar feed mixtures. Consequently, it is necessary to condition the membrane, for example, by contacting the membrane with a suitable intermediate solvent, prior to use in a non-aqueous separation process. This conditioning method has been used to convert water wet-membranes to a state useable with hexane-based oilseed miscella and with aromatic and aliphatic hydrocarbons. See International Patent Application Publication Numbers WO 0042138, and WO 0006526. Although this membrane conditioning technique has been used on a commercial scale, the method is expensive, time-consuming, and often requires the use of flammable and volatile organic compounds.

K. D. Vos and F. O. Burris, *Ind Eng Chem Prod Res Dev*, 1969, 8, 84-89 report that water can be evaporated from certain specific modified cellulose acetate reverse osmosis membranes with no loss in desalination or physical properties by soaking the membranes in a surface active agent before drying. The properties of the dried membranes in non-aqueous media is not discussed.

In spite of the above reports, there is currently no simple, safe, cost-effective method to preserve a membrane for use in non-aqueous applications.

SUMMARY OF THE INVENTION

It has been found that anionic surfactants, when used as drying agents, are capable of providing a dried membrane that is wettable in non-aqueous solvents (e.g. hexane). It has also been found that anionic surfactant treated membranes are typically wettable in water. Consequently, the invention provides a simple, inexpensive, reliable method for drying porous matrices, including separation membranes, to provide dry matrices that are re-wettable in a range of aqueous and non-aqueous environments. In one embodiment, the anionic surfactants are derived from edible foodstuffs and are especially useful for the preservation of membranes for use in food, beverage, and pharmaceutical applications.

The invention also provides a method for preparing a dried porous matrix that is wettable in non-aqueous solvents comprising treating a water-wet porous matrix with an anionic surfactant and drying to provide the dried porous matrix.

The also invention provides a porous matrix that has been dried in the presence of an anionic surfactant.

The also invention provides a porous matrix having an anionic surfactant in or on the matrix.

The invention also provides a semi-permeable membrane prepared according to a method of the invention.

The invention also provides a spiral wound membrane module comprising a membrane of the invention.

The invention also provides a process for fractionating a non-aqueous mixture comprising contacting the mixture with a semi-permeable membrane that has been dried in the presence of an anionic surfactant to provide permeate that passes through the membrane and retentate that does not pass through the membrane.

The invention also provides a process for fractionating a non-aqueous mixture comprising contacting the mixture with a semi-permeable membrane that comprises an anionic surfactant to provide permeate that passes through the membrane and retentate that does not pass through the membrane.

The invention also provides a kit useful for performing a separation in a non-aqueous environment comprising, 1) a porous matrix that has been dried in the presence of an anionic surfactant and 2) instructions for using the matrix (e.g. in a non-aqueous environment (e.g. without prior conditioning).

The invention also provides a kit useful for performing a separation in a non-aqueous environment comprising, 1) a porous matrix having an anionic surfactant in or on the matrix, and 2) instructions for using the matrix in a non-aqueous environment (e.g. without prior conditioning).

The invention also provides a permeate or a retentate prepared with a membrane or kit of the invention or prepared by a method of the invention.

DETAILED DESCRIPTION OF THE INVENTION

Specific and preferred values for terms, ranges, etc. identified herein are for illustration only; they do not exclude other defined values or other values identified herein.

Terms

The term "porous matrix" includes membranes such as reverse osmosis, nanofiltration, ultrafiltration, and microfiltration membranes, as well as porous beads, chromatography media, paper, filtration media, and the like. The invention provides a variety of porous matrices that have been dried in the presence of or that comprise an anionic surfactant. Such matrices can be used directly in non-aqueous environments without conditioning.

"Wetting" is a well known term that refers to a process in which a fluid spreads upon the external surface of a non-porous material and upon the external and internal surfaces of a porous or semi-porous material.

Anionic Surfactants

The meaning of the term "anionic surfactant" is well understood. For example, see Kirk-Othmer, *Concise Encyclopedia of Chemical TechnologyI*, John Wiley and Sons, New York, 1985, 1142-1146.

Anionic surfactants typically have a low energy chemical moiety (e.g., a hydrophobic moiety) and a polar moiety which is anionic or capable of forming an anion. The term includes carboxylates, (RCOO—, wherein R is typically a $C_9$-$C_{21}$ branched or unbranched, saturated or unsaturated hydrocarbon chain), acylated protein hydrolysates, sulfonates, sulfates, sulfated products, phosphatides, and phosphate esters. Specific examples of anionic surfactants include palmitate salts (e.g. sodium palmitate) and sodium lauryl sulfate.

In one specific embodiment of the invention the anionic surfactant is derivable from an animal product.

In one specific embodiment of the invention the anionic surfactant is derivable from a vegetable product.

In one specific embodiment of the invention the anionic surfactant is potassium oleate or sodium dodecylsulfate.

In another specific embodiment of the invention the anionic surfactant is not potassium oleate or sodium dodecylsulfate.

Non-Aqueous Mixture

The term "non-aqueous" includes, 1) a liquid capable of being fully miscible with hexane in a 50:50 proportion at 25° C., 2) a liquid that contains less than 50% water, and 3) a liquid that contains more than 10% of an organic substance.

In one specific embodiment the non-aqueous mixture can be any vegetable oil miscella containing phospholipids. The vegetable oil miscella generally comprises solvent and crude vegetable oil. The vegetable oil miscella is generally obtained by solvent extraction of vegetable seeds. Techniques for solvent extraction of vegetable seeds are well known and are described, for example, in *Bailey's Industrial Oil and Fat Products, 5th* Edition, edited by Y. H. Hui, New York, Wiley, 1996, and *Handbook of Soy Oil Processing and Utilization*, St. Louis, Mo., American Soybean Association, Champaign, Ill., American Oil Chemists' Society, the disclosures of which are incorporated herein by reference. Typically, vegetable seeds suitable for use in the present invention include soya bean, corn, ground nut, olives, linseed, rapeseed, sunflower seed, safflower seed, cottonseed oil, and grape seed.

Any suitable solvent may be used in the process. Exemplary solvents used in the process include inert hydrocarbons such as alkanes, alcohols, cycloalkanes, and simple aromatic hydrocarbons, for example, benzene and its homologues containing alkyl substituents having up to four carbon atoms, toluene, and xylenes. The alkane and alcohol solvents can be straight chain or branched. Exemplary straight chain or branched alkanes and alcohols include hexane such as n-hexane and isohexane, ethanol, n-propyl alcohol, isopropyl alcohol, and mixtures thereof. The amount of solvent present in the vegetable oil miscella may vary depending upon the particular solvent extraction design utilized. In general, it is expected that the vegetable oil miscella will include an amount of solvent of from about 45 percent by weight (wt. %) to about 90 wt. %. In one specific embodiment, the vegetable oil miscella will include an amount of solvent of from about 50 wt. % to about 85 wt. %.

In one specific embodiment of the invention the non-aqueous fluid mixture is a vegetable oil miscella.

In another specific embodiment of the invention the non-aqueous fluid mixture is an oil miscella.

In another specific embodiment of the invention the non-aqueous fluid mixture comprises a vegetable oil miscella.

In another specific embodiment of the invention the non-aqueous fluid mixture comprises an oil miscella.

In another specific embodiment of the invention the non-aqueous fluid mixture is not a vegetable oil miscella.

In another specific embodiment of the invention the non-aqueous fluid mixture is not an oil miscella.

In another specific embodiment of the invention the non-aqueous fluid mixture does not comprise a vegetable oil miscella.

In another specific embodiment of the invention the non-aqueous fluid mixture does not comprise an oil miscella.

Semi-Permeable Membranes

The term "semi-permeable membrane" includes any semi-permeable material which can be used to separate components of a feed fluid into a permeate that passes through the material and a retentate that is rejected or retained by the material. For example, the semi-permeable material may comprise organic polymers, organic co-polymers, mixtures of organic polymers, or organic polymers mixed with inorganics. Suitable organic polymers include polysulfones; poly (styrenes), including styrene-containing copolymers such as acrylonitrile-styrene copolymers, styrene-butadiene copolymers and styrene-vinylbenzylhalide copolymers; polycarbonates; cellulosic polymers, such as cellulose acetate-butyrate, cellulose propionate, ethyl cellulose, methyl cellulose, nitrocellulose, etc.; polyamides and polyimides, including aryl polyamides and aryl polyimides; polyethers; poly (arylene oxides) such as poly(phenylene oxide) and poly (xylene oxide); poly(esteramide-diisocyanate); polyurethanes; polyesters (including polyarylates), such as poly (ethylene terephthalate), poly(alkyl methacrylates), poly (alkyl acrylates), poly(phenylene terephthalate), etc; polysulfides; polymers from monomers having alpha-olefinic unsaturation other than mentioned above such as poly(ethylene), poly(propylene), poly(butene-1), poly(4-methyl pentene-1), polyvinyls, e.g. poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl urethanes), poly(vinyl ureas), poly(vinyl phosphates), and poly(vinyl sulfates); polyallyls; poly(benzobenzimidazole); polyhydrazides; polyoxadiazoles; polytriazoles; poly(benzimidazole); polycarbodiimides; polyphosphazines; etc., and interpolymers, including block interpolymers containing repeating units from the above such as terpolymers of acrylonitrile-vinyl bromide-sodium salt of para-sulfophenylmethallyl ethers; and grafts and blends containing any of the foregoing. Such organic polymers can optionally be substituted, for example, with halogens such as fluorine, chlorine and bromine; hydroxyl groups; lower alkyl groups; lower alkoxy groups; monocyclic aryl; lower acyl groups and the like.

Semi-permeable membranes can also include modified versions of organic polymers. For example, organic polymers can be surface modified, surface treated, cross-linked, or otherwise modified following polymer formation, to provide additional semi-permeable materials that can be included in semi-permeable membranes. For example, see U.S. Pat. Nos. 4,584,103, 4,906,379, 4,477,634, 4,265,959, and 4,147,745 for examples of modified organic polymers.

In one preferred embodiment, the semi-permeable membrane comprises an engineering polymer such as, for example, a polysulfone, polyethersulfone, polyimide, polyamide, polyacrylonitrile, polycarbonate, or polyvinylidenefluoride. Membranes comprising such polymers are typically stable at higher temperatures than other membranes such as cellulose acetate containing membranes. In a more preferred embodiment, the semi-permeable membrane comprises an aromatic polysulfone, polyethersulfone, polyimide, polyamide, polyacrylonitrile, polycarbonate, or polyvinylidenefluoride. Again, such aromatic polymers are typically preferred due to their stability, and in particular, due to their temperature stability.

In another embodiment, the semi-permeable membrane comprises a polysulfone, polyethersulfone, polyvinylidenefluoride, polytetrafluoroethylene, polyacrylonitrile, polycarbonate, cellulose, cellulose acetate, polyimide, polyaramide, nylon, polyamide, polysulfonamide, or a polyarylketone, or a co-polymer or modified versions of such a material.

In one embodiment, the semi-permeable membrane is not cellulose acetate. In another embodiment, the semi-permeable membrane does not comprise cellulose acetate.

Microfiltration membranes are those membranes with pores greater than about 0.1 microns in diameter. The upper pore size limitation of the microfiltration membranes is not well defined, but can be considered to be about 10 microns. Materials with pore sizes larger than about 10 microns are generally not referred to as membranes. Microfiltration membranes are commonly used to retain small particulates and microbes. Typically, these membranes permeate smaller components, such as simple salts and dissolved organic materials having a molecular weight of less than about 1,000,000 grams per mole. Microfiltration membranes usually possess the highest water permeability of the four classes of membranes, due to their large pore diameters as well as their typical high pore density. The pure water permeability (A-value) of these membranes is commonly greater than about 5,000. The units of A-value are $10^{-5}$ $cm^3$ of permeate per $cm^2$ of membrane area per second of test time per atmosphere of driving pressure. Ultrafiltration membranes typically are characterized by pore sizes of from about 0.1 micron to about 1 nanometer.

Ultrafiltration membranes are commonly classified by their ability to retain specific sized components dissolved in a solution. This is referred to as the molecular weight cut-off (MWCO), and the MWCO profile of a membrane may be determined using ASTM Method E1343-90. Ultrafiltration membranes are commonly used to retain proteins, starches, and other relatively large dissolved materials while permeating simple salts and smaller dissolved organic compounds. The water permeability of ultrafiltration membranes is commonly in the range of from about $A=100$ to about $A=5000$. In a preferred embodiment of the invention, the semi-permeable membrane is an ultrafiltration membrane, for example, an ultrafiltration membrane as described in the examples below.

Nanofiltration membranes typically are defined as membranes which possess the ability to fractionate small compounds (i.e., those with molecular weights less than 1000). The small compounds are often salts, and nanofiltration membranes are commonly used to permeate monovalent ions while retaining divalent ions. Nanofiltration membranes typically posses ionized or ionizable groups.

Although not wishing to be bound by theory, it is believed that the nanofilters can affect the separation of ionic materials through a charge-based interaction mechanism. Nanofiltration membranes also can be used to separate uncharged organic compounds, sometimes in solvents other than water. The water permeability of nanofiltration membranes is commonly in the range of from about $A=5$ to about $A=50$.

Reverse osmosis membranes can retain all components other than the permeating solvent. Like nanofiltration membranes, reverse osmosis membranes can contain ionic functional groups. Reverse osmosis membranes are commonly used to remove salt from water and concentrate small organic compounds. The water permeability of reverse osmosis membranes is commonly in the range of from about $A=2$ to about $A=20$.

Although the mechanisms that govern membrane performance are not exactly defined, some basic theories have been postulated. A good review of some membrane transport theories can be found in, J. G. Wijmans, R. W. Baker, *Journal of Membrane Science*, 1995, 107, 1-21.

In addition, semi-permeable membranes also can be classified by their structure. Examples are symmetric, asymmetric, and composite membranes. Symmetric membranes are characterized by having a homogeneous pore structure throughout the membrane material. Examples of symmetric membranes include some microfiltration membranes, many ceramic membranes, and track-etched microporous membranes.

Asymmetric membranes are characterized by a heterogeneous pore structure throughout the membrane material. These membranes usually posses a thin "skin" layer having a smaller pore structure than the underlying material. Many commercially available ultrafiltration membranes posses an asymmetric structure.

Membranes of the invention typically have a pore size of less than about 0.2 microns. In a specific embodiment, membranes of the invention have a pore size of less than about 0.05 microns. In another specific embodiment, membranes of the invention have a pore size of from about 50 nanometers to about 3 nanometers. In another specific embodiment, membranes of the invention have a pore size of from about 50 nanometers to about 0.5 nanometers. In yet another specific embodiment, membranes of the invention have a pore size of from about 20 nanometers to about 1 nanometer.

The term "pore size" means the mode diameter of the pores in the material.

"Composite membranes" have at least one thin film (matrix) layered on a porous support. The thin film is usually a polymer of a thickness of less than about 20 microns, and often less than about 1 micron. The porous support should be relatively stable to the feed solution, pressure, and temperature, and should be compatible with the thin film. The porous support is commonly a polymeric ultrafiltration or microfiltration membrane, such as a polysulfone, polyethersulfone, polyvinylidene fluoride, polyvinylchloride, ceramic, or porous glass.

In one specific embodiment, the invention provides a porous matrix that is a semi-permeable membrane.

In one specific embodiment, the invention provides a semi-permeable membrane that is a composite membrane.

In one specific embodiment, the invention provides a composite membrane that comprises a polysulfone, polyethersulfone, polyvinylidene-fluoride, polytetrafluoroethylene, polyacrylonitrile, polycarbonate, cellulose, cellulose acetate, polyimide, polyaramide, nylon, polyamide, polysulfonamide, polyarylketone, or a co-polymer or a modified polymer thereof.

In one specific embodiment, the invention provides a composite membrane that comprises a polysulfone, polyethersulfone, polyvinylidene-fluoride, polytetrafluoroethylene, polyacrylonitrile, polycarbonate, cellulose, polyimide, polyaramide, nylon, polyamide, polysulfonamide, polyarylketone, or a co-polymer or a modified polymer thereof.

In one specific embodiment, the invention provides a composite membrane that does not comprise a cellulose acetate film.

In one specific embodiment, the invention provides a composite membrane comprises a polyethersulfone film.

In one specific embodiment, the invention provides a membrane that is a reverse osmosis membrane, nanofiltration membrane, ultrafiltration membrane, or microfiltration membrane.

In one specific embodiment, the invention provides a membrane that is an ultrafiltration membrane.

In one specific embodiment, the invention provides a membrane that is a nanofiltration membrane.

In one specific embodiment, the invention provides a membrane that is a reverse-osmosis membrane.

In one specific embodiment, the invention provides a composite membrane that has a porous support that is an ultrafiltration or a microfiltration membrane.

In one specific embodiment, the invention provides a composite membrane that has a porous support that is an ultrafiltration or a microfiltration membrane, wherein the ultrafiltration or microfiltration membrane comprises a polysulfone, polyethersulfone, polyvinylidene fluoride, polyvinylchloride, ceramic, or porous glass.

In one specific embodiment, the invention provides a composite membrane that has a porous support that is an ultrafiltration or a microfiltration membrane, wherein the ultrafiltration or microfiltration membrane comprises a polysulfone, polyethersulfone, polyvinylidene fluoride, or polyvinylchloride.

In one specific embodiment, the invention provides a semi-permeable membrane that has a pore size of less than about 0.1 microns.

In one specific embodiment, the invention provides a semi-permeable membrane that has a pore size of less than about 0.05 microns.

In one specific embodiment, the invention provides a semi-permeable membrane that has a pore size of from about 50 nanometers to about 1 nanometer.

In one specific embodiment, the invention provides a semi-permeable membrane that has a pore size of from about 50 nanometers to about 0.5 nanometers.

In one specific embodiment, the invention provides a semi-permeable membrane that has a pore size of from about 10 nanometers to about 1 nanometer.

In one specific embodiment, the invention provides a semi-permeable membrane that has an A-value of less than about 10,000.

In one specific embodiment, the invention provides a semi-permeable membrane that has an A-value of less than about 5,000.

In one specific embodiment, the invention provides a semi-permeable membrane that has an A-value of less than about 2,000.

In one specific embodiment, the invention provides a semi-permeable membrane that has an A-value of less than about 500.

In one specific embodiment, the invention provides a semi-permeable membrane that has an A-value of less than about 30.

In one specific embodiment, the invention provides a semi-permeable membrane that has a molecular weight cutoff of less than about 1,000,000.

In one specific embodiment, the invention provides a semi-permeable membrane that has a molecular weight cut-off of less than about 500,000.

In one specific embodiment, the invention provides a semi-permeable membrane that has a molecular weight cut-off of less than about 100,000.

In one specific embodiment, the invention provides a semi-permeable membrane that has a molecular weight cut-off of less than about 30,000.

In one specific embodiment, the invention provides a semi-permeable membrane that has a molecular weight cut-off of less than about 10,000.

In one specific embodiment, the invention provides a semi-permeable membrane that has a molecular weight cut-off of less than about 3,000.

In one specific embodiment, the invention provides a semi-permeable membrane that is wettable in a liquid that has a surface tension of less than 50 dyne/cm.

In one specific embodiment, the invention provides a semi-permeable membrane that is wettable in a liquid that has a surface tension of less than 40 dyne/cm.

In one specific embodiment, the invention provides a semi-permeable membrane that is wettable in a liquid that has a surface tension of less than 30 dyne/cm.

In one specific embodiment, the invention provides a semi-permeable membrane that is wettable in a liquid that has a surface tension of less than 25 dyne/cm.

In one specific embodiment, the invention provides a semi-permeable membrane that is wettable in a liquid that has a surface tension of less than 20 dyne/cm.

General Matrix and Membrane Preparation

Membranes can be prepared using methods that are known in the field, for example, as described in the Handbook of Industrial Membrane Technology, 1990, edited by Mark C. Porter, ISBN 0-8155-1205-8. Membranes of the invention are typically contacted with an anionic surfactant prior to drying. The anionic surfactant can be present in a solution used to form the membrane or can be added as part of a post-treatment process.

When an anionic surfactant is added as a post-treatment, the membrane can be contacted with the anionic surfactant at any concentration and for any amount of time suitable to provide a membrane that is wettable in a non-aqueous solvent. Typically, the membrane is contacted with the anionic surfactant for a time up to about 2 hours (e.g., for about 20 seconds to about 60 minutes) at an anionic surfactant concentration of from about 1% to its water solubility. However, longer contact times or different concentrations of anionic surfactant can be used.

The membrane can typically be dried under any condition suitable to provide a membrane that can be used directly in a non-aqueous solvent. For example, the membranes can be dried using airflow, reduced pressure, or elevated temperature, or any combination thereof, provided that the temperature of the drying process does not reach a point where the membrane is significantly damaged. With membranes that are resistant to at least 120° C., many membranes can be dried in an oven at 90 to 120° C. for about two to about six minutes.

Spiral Wound Elements

One common device that utilizes semi-permeable membranes (e.g., RO, NF, and UF membranes) is a spiral wound membrane element. Such a spiral wound element typically comprises a leaf, or a combination of leaves, wound around a central tube with a feed spacer material. Such spiral wound membrane elements and methods for their preparation are well known. For example see Bray (U.S. Pat. No. 3,417,870)

and Lien (U.S. Pat. No. 4,802,982). The invention also provides a spiral wound membrane element comprising a semi-permeable membrane of the invention. Such elements are particularly useful for separating (e.g., purifying) non-aqueous feed streams.

Separations

In one specific embodiment, the invention provides a method for fractionating a non-aqueous fluid mixture comprising contacting the fluid mixture with a semi-permeable membrane of the invention to provide a permeate that passes through the membrane and retentate that does not pass through the membrane. In the practice of such a method, membranes of the invention (e.g., membranes that have been dried in the presence of an anionic surfactant or that comprise an anionic surfactant) can be used directly (e.g., with reduced or no need for conditioning before contact with the non-aqueous mixture). The membranes can typically be used to fractionate any non-aqueous mixture.

In one embodiment of the invention a vegetable oil miscella is passed through a semi-permeable membrane resulting in a phospholipid containing retentate and a phosphorus reduced permeate. If desired, the vegetable oil miscella from the first semi-permeable membrane can be passed through at least one additional semi-permeable membrane. The phosphorus reduced permeate is typically less than about 5 ppm to about 10 ppm phosphorus. The phospholipid containing retentate is a fluid lecithin product. If desired, the phospholipid containing retentate can be further processed to obtain a deoiled lecithin product. Where the vegetable oil miscella contains solids such as meal fines obtained from seed hulls, dirt, sand grit, and the like, the vegetable oil miscella may be prefiltered prior to passing the vegetable oil miscella through the semi-permeable membrane of the present process to avoid clogging the semi-permeable membrane.

The lecithin product according to the invention can be used in any application where lecithin has been used. In addition, the lecithin product according to the invention can be used in any other applications where desirable. For example, the lecithin product according to the invention can be used as an emulsifier, surfactant, stabilizer, releasing agent, wetting agent, dispersing agent, lubricant, viscosity control agent, crystallization agent, softening agent, emollient, anti-dusting agent, and high nutritional ingredient. Various applications in which the lecithin product according to the invention can be used include food applications, feed applications, technical applications, cosmetic applications, pharmaceutical, and nutraceutical applications. Exemplary food applications include chocolate, chocolate derivatives, bakery, confectionary, icings, dairy products, cheese products, pasta products, margarine, shortening, fat mixtures, emulsions, spray oils, dressings, instantizing of cacao, milk, non dairy protein powders, release agents, soups, sauces, mayonnaises, dressings, meats, gravies, canned meats, meat analogues, bread improvers, beverages, energy drinks, snacks, desserts (such as, ice cream and bars), meal improvers, bread improvers, chewing gum, colors, flavor mixes, emulsifier mixes, baby food, and antioxidants. Exemplary feed applications include emulsifiers and sources of high nutritional value in feed for, for example, fish, shrimp, calves (as milk replacer), pigs, sows, piglets, pets, mink, and poultry. Exemplary technical applications includes as a dispersing agent in, for example, paints, inks, coatings, magnetic tapes, and discs, as a softening agent in, for example, leather and textiles, as an emulsifier in, for example, crop protection and agrochemicals, as lubricants, oils, adhesives, adsorbents, flocculants, corrosion inhibitors, ceramics, glass, detergents, metal processing, paper, petroleum products, photocopying, photography, polymers, rubbers, and textiles. Exemplary cosmetic applications include as a dispersing agent in lipstick and nail polish, and as an emulsifier/stabilizer in shampoos, creams, and lotions. Exemplary pharmaceutical and/or nutraceutical applications include as a natural source of phospholipids. Exemplary phospholipids include phosphatidylcholine and vitamin E.

The lecithin product according to the invention can be used as a starting material for derived processes and products, such as, deoiled lecithin, phospholipids fractions, enzymatical modifications, chemical modifications, and compounded products. Exemplary chemical modifications include hydroxylation, acetylation, interesterification, and hydrogenation. Exemplary compounded products include use on a carrier and with emulsifiers.

In one specific embodiment the invention provides a method for treating vegetable oil miscella comprising passing the miscella through a membrane comprising a semi-permeable membrane comprising a component selected from the group consisting of sodium dodecyl sulfate and potassium oleate to obtain a rententate and a permeate.

The invention will now be illustrated by the following non-limiting Examples. In Examples 1 through 4, the percent phospholipids rejection is calculated from the following equation:

$$\% \text{ Phospholipid Rejection} = \frac{(\text{Retentate phospholipids concentration} - \text{Permeate phospholipids concentration})}{\text{Retentate phospholipids concentration}} \times 100$$

Example 1

A vegetable oil miscella was treated to remove phospholipids from the vegetable oil. The vegetable oil miscella was passed through a 75 micron scrap surface screen filter and then through a 6 micron absolute pleated filter, which was coated with 0.1% diatomaceous earth. The 75 micron screen filter is available from Solution Technology, Wisconsin, and the 6 micron pleated filter was purchased from Osmonics, Inc., Minnetonka, Minn. The filtrate was then passed through two dead-end filters having a pore size of 0.45 micron and 0.2 micron respectively. The 0.45 micron dead-end filter was purchased from Parker Hannifin, Indianapolis, Ind., and the 0.2 micron dead-end filter was purchased from Osmonics, Inc., Minnetonka, Minn.

The resulting vegetable oil miscella comprising 79.7 wt. % hexane, 2.6 wt. % phospholipids, and 17.7 wt. % oil was passed through two of the same spiral wound 4 inch by 40 inch semi-permeable membranes of the present invention. The semi-permeable membrane was a polyethersulfone ultrafiltration membrane comprising potassium oleate and having an A-value of $1,870 \cdot 10^{-5}$ cm$^3$ of permeate per cm$^2$ of membrane area per second of test time per atmosphere of driving pressure. The semi-permeable membrane was prepared by immersing a polyethersulfone, ultrafiltration membrane in a solution of 16% potassium oleate, 10% ethanol and 74% deionized water for 15 to 20 seconds, then drained and dried in a 100° C. oven for 3 minutes. The vegetable oil miscella was passed through the spiral wound membrane elements for a period of one minute at a temperature of 39.4° C. and at a circulation rate of 20 gallons per minute. The filtration rate obtained from the 2 semi-permeable membranes was 10.46 kilogram per minute at an average transmembrane pressure of 0.9 psi. There was produced a phospholipid containing retentate comprising 10.66% phospholipid and a permeate comprising 56.6 ppm phosphorus on a hexane-free oil basis. It was observed that the value of the permeate flux was 66.9 liter/hour/meter$^2$ (9.56 kilogram/hour/meter$^2$ on a hexane-free oil basis). From the data above, it was observed that the semi-permeable membrane of the present invention provided 99.84% rejection of the phospholipids.

Example 2

The procedure of Example 1 was followed, except that the vegetable oil miscella comprising 80.6 wt. % hexane, 2.6 wt. % phospholipids, and 16.8 wt. % oil was passed through the semi-permeable membrane for a period of 15 minutes at a temperature of 44.7° C. The filtration rate obtained from the 2 membranes was 11.14 kilogram per minute at an average transmembrane pressure of 3.2 psi. There was produced a phospholipid containing retentate comprising 15.34% phospholipid and a permeate comprising 49.9 ppm phosphorus on a hexane-free oil basis. It was observed that the value of the permeate flux was 71.6 liter/hour/meter$^2$ (9.7 kilogram/hour/meter$^2$ on a hexane-free oil basis). From the data above, it was observed that the semi-permeable membrane of the present invention provided 99.81% rejection of the phospholipids.

Example 3

The procedure of Example 1 was followed, except that the vegetable oil miscella comprising 79.5 wt. % hexane, 2.6 wt. % phospholipids, and 17.9 wt. % oil was passed through the semi-permeable membrane for a period of 35 minutes at a temperature of 47.7° C. The filtration rate obtained from the 2 membranes was 11.82 kilogram per minute at an average transmembrane pressure of 5.7 psi. There was produced a phospholipid containing retentate comprising 28.66% phospholipid and a permeate comprising 60.0 ppm phosphorus on a hexane-free oil basis. It was observed that the value of the permeate flux was 75.7 liter/hour/meter$^2$ (10.93 kilogram/hour/meter$^2$ on a hexane-free oil basis). From the data above, it was observed that the semi-permeable membrane of the present invention rejected 99.37% phosphorus in 35 minutes, that is, it was observed that the membrane provided 99.37% rejection of the phospholipids.

Example 4

The procedure of Example 1 was followed, except that the vegetable oil miscella comprising 78.9 wt. % hexane, 2.6 wt. % phospholipids, and 18.5 wt. % oil was passed through the semi-permeable membrane for a period of 55 minutes at a temperature of 49.2° C. The filtration rate obtained from the 2 membranes was 12.9 kilogram per minute at a transmembrane pressure of 6.7 psi. There was produced a phospholipid containing retentate comprising 28.66% phospholipid and a permeate comprising 51.2 ppm phosphorus on a hexane-free oil basis. It was observed that the value of the permeate flux was 74.9 liter/hour/meter$^2$ (11.17 kilogram/hour/meter$^2$ on a hexane-free oil basis). From the data above, it was observed that the semi-permeable membrane of the present invention rejected 99.46% phosphorus in 55 minutes.

Example 5

A knife-over-roll coating system was used to coat a dope solution of polyethersulfone on a web of polyester backing material. The web was then run through a water tank to cause the phase-inversion membrane formation process, resulting in a membrane. The membrane was then run through a second water tank to remove residual solvents from the coating process.

The produced membrane was evaluated in an Amicon 8200 stirred cell at 20 psi, using DI water for the flux measurement and an aqueous solution of dextrans for determination of the membrane molecular weight cut-off (MWCO) using a procedure adapted from ASTM Method E1343-90. Data are shown in Table 3. This membrane was employed as a "wet-control" of the membrane's performance attributes for comparison of drying with or without various chemical agents in solution.

Samples of the membrane were cut from the master roll of membrane and treated with a solution of potassium oleate (as indicated in Table 3) dissolved in 10% ethanol and DI water. The membrane samples were immersed in the drying solution for 15-20 seconds, then drained and placed into a 100° C. oven for 3 minutes, then were removed and left in ambient air conditions at least 18 hours prior to testing. Dried samples were tested for flux and MWCO in the same manner as the wet control membrane.

TABLE 3

Performance of PES-1 versus drying with specified chemical agents in solution.

| % Potassium Oleate | Flux, 1 mh | MWCO @ 90% Dextran Rejection |
| --- | --- | --- |
| Wet control | 590 | 56,000-91,000 |
| 0% | 20 | Not determined |
| 5% | 408 | 33,000-46,000 |
| 10% | 438 | 39,000-48,000 |
| 14% | 615 | 78,000-91,000 |
| 16% | 640 | 65,000-84,000 |
| 18% | 680 | 66,000-85,000 |

Example 6

The membrane described in Example 5, which was dried from the 16% potassium oleate solution, was tested in a hexane-based miscella degumming application. This membrane gave identical performance properties on a hexane-based miscella degumming application to a wet control membrane sample that had been solvent exchanged (conditioned) into hexane by successive 30 minute soaks in isopropanol, 50/50 hexane/isopropanol, and 90/10 hexane/soybean oil. A membrane similar dried without the aid of a drying agent gave extremely poor performance, and a similarly membrane sample dried using a traditional glycerin drying technique yielded no significant permeate flow. Accordingly, the membrane of the invention could be used in the hexane-based miscella degumming application without prior conditioning.

Example 7

A polyethersulfone solution was cast on a polyester substrate and then placed in contact with water to form the polyethersulfone into a solid porous coating. The water permeability, or A-value, of this membrane was found to be 1530. The material was then placed into a solution of 90% water and 10% sodium dodecyl sulfate (Aldrich Catalog #85, 192-2) followed by drying at 80° C. for 4 minutes. The resulting membrane is characterized by a water permeability value of 1500, which is essentially the same water permeability as the undried membrane, based on the limits of membrane and test variability. Thus, the water permeability of the dried membrane was not significantly diminished.

Example 8

A polyethersulfone membrane is formed in the classical phase inversion process (e.g., web-handling equipment comprised of a knife-over-roll metering hopper, coagulation and rinse tank was used to deposit a layer of polymer solution onto a polyester nonwoven support fabric at a constant web speed). This coated fabric is subsequently coagulated in a pure water bath, and rinsed to remove solvent residuals.

The resulting membrane is evaluated in an Amicon 8200 stirred cell, using DI water for flux and dextrans for MWCO determination by a method adapted from ASTM Method E1343-90. This membrane is employed as a "wet-control" of the membrane's performance attributes for comparison of drying with or without anionic surfactants in solution.

Samples of the membrane are cut from the master roll of membrane and treated with a solution of an anionic surfactant. The membrane samples are immersed into the drying solution for 15-20 seconds, drained, placed into a 100° C. oven for 3 minutes, removed, and left in ambient air conditions at least 18 hours prior to testing. Dried samples are tested for flux and MWCO in the same manner as the wet control membrane for comparison.

All publications, patents, and patent documents (including U.S. Provisional Patent Application Ser. Nos. 60/475,281, 60/475,282, 60/475,582, and 60/474,991) are incorporated by reference herein, as though individually incorporated by reference. The invention has been described with reference to various specific and preferred embodiments and techniques. However, it should be understood that many variations and modifications may be made while remaining within the spirit and scope of the invention.

What is claimed is:

1. A method for fractionating a non-aqueous mixture comprising contacting the mixture with a semi-permeable membrane that has been dried in the presence of an anionic surfactant to provide permeate that passes through the membrane and retentate that does not pass through the membrane, wherein the non-aqueous fluid comprises an oil miscella mixture.

2. The method of claim 1 wherein the anionic surfactant is potassium oleate or sodium dodecyl sulfate.

3. The method of claim 1 wherein the semi-permeable membrane is a composite membrane.

4. The method of claim 3 wherein the composite membrane comprises a polysulfone, polyethersulfone, polyimide, polyamide, polyacrylonitrile, polycarbonate, or polyvinylidene-fluoride film.

5. The method of claim 3 wherein the composite membrane comprises an aromatic polysulfone, polyethersulfone, polyimide, polyamide, polyacrylonitrile, polycarbonate, or polyvinylidene-fluoride film.

6. The method of claim 3 wherein the composite membrane comprises a polyethersulfone film.

7. The method of claim 1 wherein the semi-permeable membrane has a pore size of less than about 0.1 microns.

8. The method of claim 1 wherein the semi-permeable membrane has a pore size of from about 50 nanometers to about 0.5 nanometers.

9. The method of claim 1 wherein the semi-permeable membrane has an A-value of less than about 10,000.

10. The method of claim 1 wherein the semi-permeable membrane has an A-value of less than about 2,000.

11. The method of claim 1 wherein the semi-permeable membrane has a molecular weight cut-off of less than about 1,000,000.

12. The method of claim 1 wherein the semi-permeable membrane has not been conditioned prior to contact with the mixture.

13. The method of claim 1 wherein the oil miscella is a vegetable oil miscella.

* * * * *